March 24, 1931.  F. R. DEAN  1,797,568
BLANK FORMING APPARATUS AND METHOD
Filed Sept. 1, 1926  2 Sheets-Sheet 1
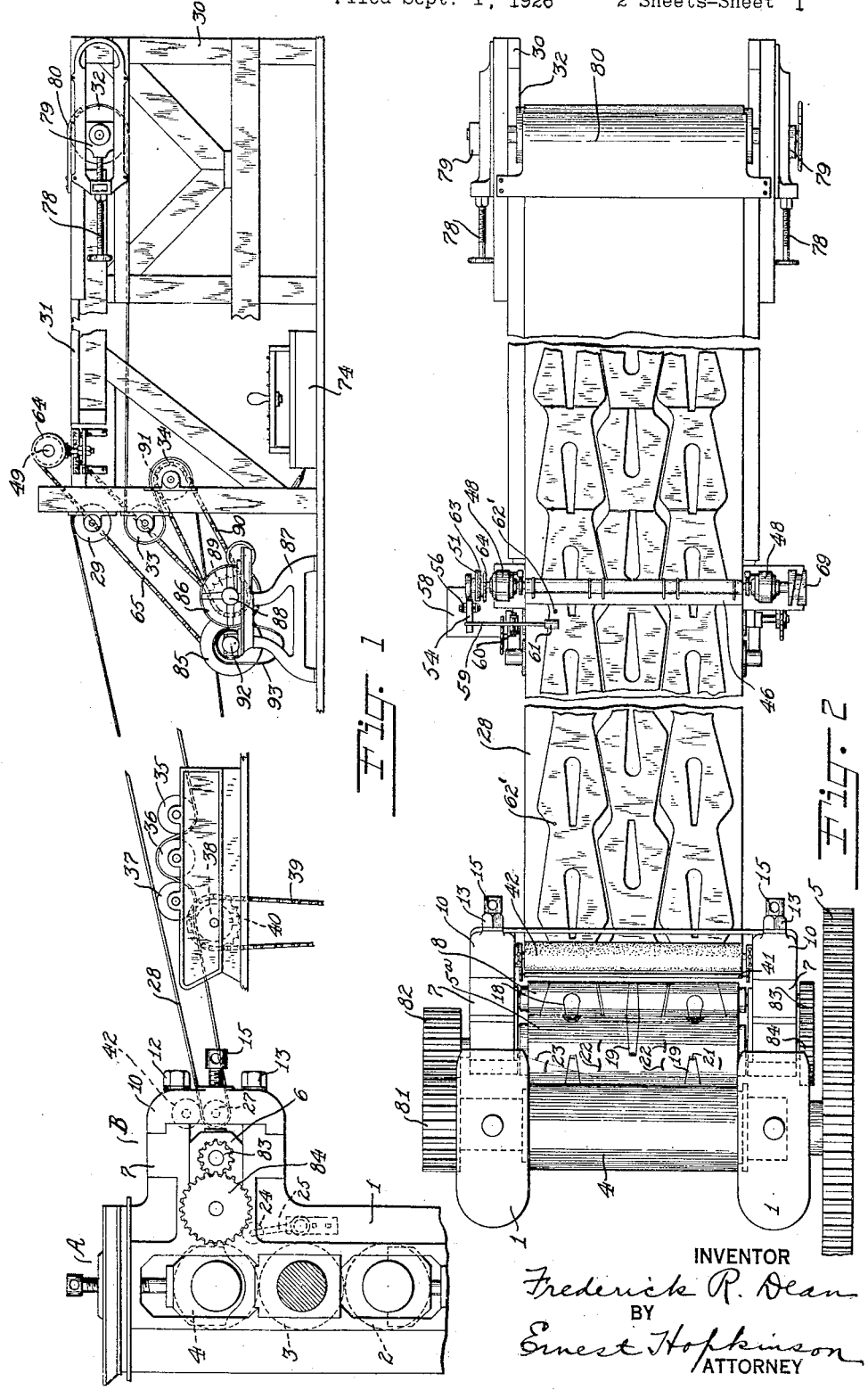
INVENTOR
Frederick R. Dean
BY
Ernest Hopkinson
ATTORNEY March 24, 1931.  F. R. DEAN  1,797,568
BLANK FORMING APPARATUS AND METHOD
Filed Sept. 1, 1926   2 Sheets-Sheet 2
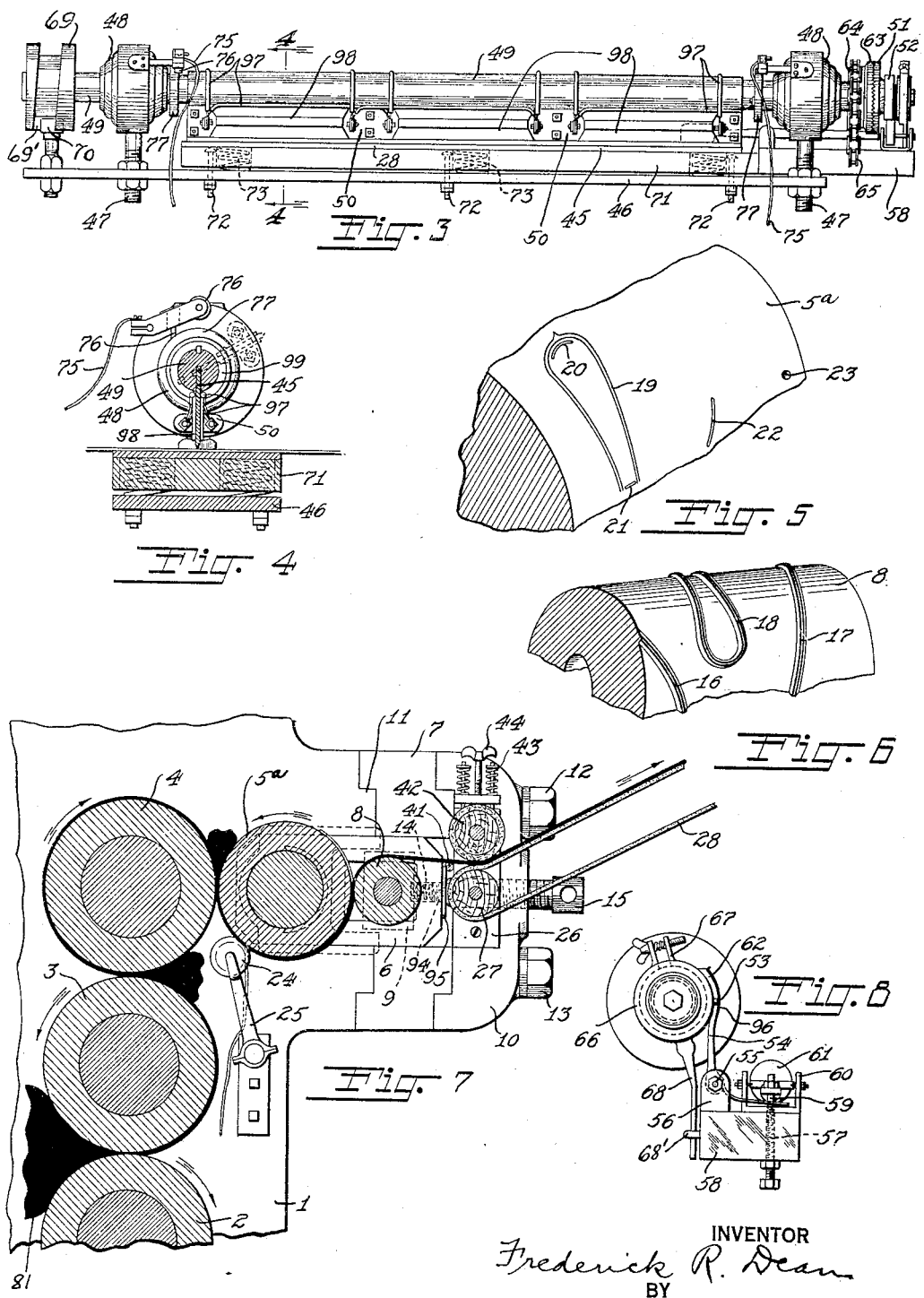

Patented Mar. 24, 1931

1,797,568

UNITED STATES PATENT OFFICE

FREDERICK R. DEAN, OF NAUGATUCK, CONNECTICUT, ASSIGNOR TO THE GOODYEAR'S INDIA RUBBER GLOVE MFG. COMPANY, OF NAUGATUCK, CONNECTICUT, A CORPORATION OF CONNECTICUT

BLANK-FORMING APPARATUS AND METHOD

Application filed September 1, 1926. Serial No. 132,989.

This invention relates to improvements in methods and apparatus for constructing blanks of rubber and similar plastic stock. More specifically it relates to an improved method and apparatus for forming blanks for rubber shoe uppers.

In the usual process of making blanks for rubber shoe uppers, the compounded rubber stock is first calendered to form a sheet of desired gauge and then suitably embossed on one side with the outlines of the blank by passing it over an embossing roll. The stock as it comes from the embossing roll is sheeted into elongated strings and for example wound upon reels or placed on long frames or in books between liners of fabric where it is kept until the blanks are manually cut out by operators. When the stock is ready to be cut it is unwound from the reel or removed from the books and the individual blanks cut out by the operator. In this process the operator either follows the outline of a blank with a knife or uses a hand die and mallet. In either case considerable skill, time and labor are required. The cutting is ordinarily performed in the cutting room, which usually is located some distance from the calender room, and the cold scrap, which amounts to 40% or more, must then be returned to the calender room for reworking.

An object of this invention is to provide an improved means for mechanically forming blanks out of rubber or similar plastic material.

A further object is to provide improved automatic means for returning the waste rubber while still warm and plastic to the bank of stock which is being sheeted.

Another object is to provide for maintaining the strip of blanks rigid against shrinkage or distortion until it assumes a relatively set condition.

Still another object is to provide means for mechanically severing the blanks.

A further object is to furnish the maker with completed blanks directly from the calender.

It is also an object to provide means for removing all pieces of rubber stock, which may remain on the conveyor at the end of the process, automatically from the end of the conveyor.

A still further object is to provide an improved method of forming sheet rubber blanks.

These and other objects are attained by the mechanism illustrated in the accompanying drawings, in which:

Fig. 1 is a side view of the entire machine.
Fig. 2 is a top plan view thereof.
Fig. 3 is a front view of the cut-off mechanism.
Fig. 4 is a section on the line 4—4 of Fig. 3.
Fig. 5 is a perspective view of the portion of the print or embossing roll.
Fig. 6 is a perspective showing a portion of the grooving roll.
Fig. 7 is a section through the calender showing the grooving and embossing rolls.
Fig. 8 is an end view of a cutting-off knife trip clutch.

A suitable mechanism for accomplishing the invention comprises a calender for sheeting rubber stock designated generally by the letter A, a grooving and embossing unit designated by the letter B, whereby the stock is formed into strips of embossed attached blanks, a conveyor 28 for receiving the strips of blanks and holding them firmly and for carrying them into the path of a knife 45 which knife is actuated at intervals to transversely sever the strips into individual blanks.

The calender is of the usual vertical type consisting of the frame 1 carrying the three chilled iron rolls 2, 3, 4 in suitable bearings, the rolls being geared to each other, one of the gears 81, being shown in Fig. 2. The calender is connected to a source of power through gear 5 whereby its rolls are driven in rotary movement. The adjacent rolls move in opposite directions whereby a bank of rubber stock applied to the rolls will be sheeted between the rolls as shown in Fig. 7 and delivered from the top roll 4. The calender is heated by steam according to the usual practice through a steam pipe (not shown), or in any other suitable manner.

Mounted upon the frame 1 of the calender in a position horizontally opposite the top roll 4 is a steel print or embossing roll 5ª journalled in bearings 6 which fit in grooves in the frame 1 for adjustment horizontally. These bearings are secured in place by means of bars 7 and cross bars 10 which are bolted to the frame 1 of the calender by bolts 12 and 13. Adjustment of bearings 6 horizontally is provided for by the set screws 15 which have screw threaded engagement with the cross bars 10 and bear at their base against wear plates 95 which are pressed against bearings 6. This adjustment provides for altering the thickness of the rubber stock passing between the rolls 4 and 5ª. Print roll 5ª is driven in rotation by the gear 82 which meshes with the gear 81 of the calender.

The bearings 6 are provided with rectangular apertures into which the bearings 9 of the grooving roll 8 are fitted for a slidable attachment. The grooving roll is maintained in flexible pressing engagement with the print roll by means of spiral springs 14 which press at one end against the bearings 9 and at their other end against the set screws 94 which have screw threaded engagement with the bearings 6. The tension of the springs can be varied by turning the set screws. By this arrangement, the two rolls 5ª and 8 can be adjusted with respect to the roll 4 as a unit by screw 15. The grooving roll in the specific embodiment shown is one-half the diameter of the print roll and is driven in rotation by the print roll through the gear 83 which meshes with the gear 84 carried by the print roll. The rolls are heated by steam from a steam pipe (not shown) entering them at their ends, or in any other suitable manner.

The grooving roll carries rigidly upon its surface raised ribs 16 and 17 which extend around the roll circumferentially in a path corresponding to the outside outlines of one rubber shoe upper blank. There is thus constituted circumferentially of the roll the outside outlines of one blank. These outlines consist of alternate widening and converging lines. In the specific example illustrated in the drawings there have been formed a series of these ribs to constitute the outlines of three blanks, but the number may be varied as desired. Between the ribs 16 and 17 a rib 18 is positioned which is in the form of the elongated outline of the throat of a rubber shoe upper blank, but slightly smaller. This rib extends in an unbroken extent from base to base so as to form a continuous outline within the throat of a blank. The ribs 16, 17 and 18 have a narrow blunt or flat outer side. In operation the roll 8 is heated to a higher temperature than roll 5ª, for instance 200° F. or more, and due to this heat and the spring pressure on roll 8, the ribs 16, 17 and 18 practically melt their way into the rubber grooving the same deeply, but without completely severing it, so that the ribs do not come into actual contact with roll 5ª, which would cause scoring or marking of the roll.

In the present instance the ribs are formed as ridges of steel integral with the roll and projecting outward from the surface thereof about $\frac{1}{16}$ of an inch, with an outer side also about $\frac{1}{16}$ of an inch in width. If desired the surface of the ribbed roll can itself be grooved and detachable ribs of desired size inserted therein.

The print or embossing roll carries upon its surface grooves 19 shaped in the outline of the throat of a rubber shoe upper blank and slightly larger in size, so that rubber stock which is passed over and pressed into the groove by the top calender roll will form a raised edge or bead adjoining the throat of the blank. In the embossing roll illustrated in the drawings there are two of these grooves disposed circumferentially of the roll and three of them horizontally.

Positioned within the groove 19 on the steel embossing roll and located adjacent each end of the elongated outline formed thereby are smooth surfaced inserts 20 and 21 formed of silver, copper, or any other material of high heat conductivity to which, when sufficiently heated, rubber will adhere. Other inserts 22 of a like metal are positioned on the print roll at points which lie opposite the spaces between the ribs 16 and 17 of the ribbed roll and exteriorly of the outlines of the blanks. In other words the inserts 20, 21 and 22 are so placed as to lie opposite and contact with those portions of the stock on the roll 5ª which are to form scrap, and as the inserts have a much greater affinity for the rubber than the body of the roll the scrap adheres to them is torn loose from the remainder of the stock at the grooves and is carried around into the bank between rolls 4 and 5ª.

Recesses 23 are positioned in the print roll at points laterally in alignment with the bases of the grooves 19, which recesses will form lugs or projections upon the portion of a sheeted stock which is to constitute a strip of blanks. The projections formed on the stock by these recesses are designed to serve as an actuating means for a later described transversely extending knife which is to sever the blanks.

There has thus been disclosed a series of heated rolls 2, 3, 4, 5ª, and 8 disposed in pairs in operative relation to pass rubber stock in a sheet between each pair, all of the rolls operating at the same rate of peripheral speed. If desired and when the stock permits there can be substituted for the rolls 2, 3 and 4 of the calender a single roll which shall cooperate with the print roll to sheet out a bank of stock disposed between them.

A knife 24 is carried by an arm 25 secured to the frame 1 of the calender at each side and arranged to bear against the print roll and trim off the outside edge of the stock as it is carried in rotation upon the surface of the print roll.

The cross bars 10 which serve as an abutment to hold the bearings 6, also secure the bearings 26 for a conveyor roller 27. The conveyor belt 28 passes over the roller 27 to a roller 29 suitably mounted for rotation upon a frame 30. Frame 30 carries a table surface 31 over which the belt passes to a further roller 32 positioned at the end of the table. The belt is returned to rollers 33 and 34 which are adjustably mounted upon the frame 30 so that the belt can be centered. The belt is then led over rolls 35, 36, 37 and 38 which are mounted in close relation upon a suitable frame, to one of which rolls 38 the power which drives the belt is applied by chain 39 and sprocket 40. By means of this arrangement of the four last named rolls the belt is practically positively driven. The belt is led from here back around the roll 27. Driving connection for the belt leads from gear 5 on the calender through a series of connections (not shown) to the chain 39. The belt in the device illustrated is made of a composition and provided with a fabric surface. The fabric surface serves as a holding surface for the hot unvulcanized rubber stock which is delivered thereto. Any other belt with a holding surface such as roughened leather could be substituted therefor. Adjustment of the tightness of the belt is provided for by means of a sliding support for the bearing 79 of roll 32 adjustable laterally on the frame 30 by means of a pair of set screws 78.

The roll 27 is so positioned that the separate strips of connected blanks are fed upon the belt substantially immediately after their formation and delivery from between rolls 5ª and 8. A small roller 41 positioned between the grooving roll and roll 27 aids in leading the stock upon the carrier. Positioned above the roll 27 is a presser roll 42 mounted for rotation in bearings between cross bar 10 and bar 7 on the frame 1. This roll is adjustable vertically and is held in yielding engagement with the belt by the springs 43 which press it downwardly. Adjustment of the tension of the springs is secured by the screw threaded bolt 44. The roll in the specific embodiment illustrated is made of wood covered with a layer of felt which forms a yielding surface. Any material having a similar yielding effect is suitable such for example as a thick layer of loosely woven cloth of any kind, or a layer of soft vulcanized rubber. Presser roll 42 operates to press the hot strips of stock, immediately as they are formed, into adhesive engagement with the surface of the conveyor where they are held immovable with respect to the conveyor. This prevents the strips from distorting by shrinkage during cooling.

A knife 45 is mounted transversely across the conveyor between the roll 29 and the table 31 at a point just prior to the passage of the conveyor over the table 31. This knife is carried by a bed plate 46 which is secured to the frame 30. Supports 47 extend upwardly from the bed plate and carry the bearings 48 in which the shaft 49, upon which the knife blade 45 is mounted, is adapted to rotate. Adjustment of the bearings vertically is provided for by screw threaded connection of the supports 47 with the bed plate 46. In the particular construction of mounting for the knife blade illustrated a groove is formed in the shaft 49 and the knife blade 45 inserted therein and secured rigidly in place. Clamps 50 are used to secure to the blade electric heating units to be hereinafter described.

Rotation of the shaft is caused by the following elements: The shaft 49 protrudes beyond the bearings at its ends and carries at one end a clutch comprising a spring pressed trip clutch member 51 slidably keyed thereon and a freely rotatable clutch member 63. Rigid with the trip clutch member 51 is the collar 52 which bears a lug 53 shown in Fig. 8 upon its surface. A dog 54 is pivoted at 55 to a fork 56 carried by the support 58, which dog has an edge 62 tapering toward its upper end and a shoulder 96 both of which have engagement with the lug 53 as shown in Fig. 8. The tapered edge 62 operates to wedge the lug 53 to one side as the lug swings downwardly during the rotation of the knife and thereby move the spring pressed clutch member 51 to one side, thus disengaging the clutch. The spring (not shown) of member 51 normally tends to keep members 51 and 63 engaged. The shoulder 96 when engaged by lug 53 halts the rotation of the clutch member. Normally the dog 54 is held against the collar 52 by the spring 57. The dog is actuated by means of the lever 59 pivoted to the fork member 60 carried by the support 58. One end of lever 59 bears against the lower end of dog 54 while its opposite end carries a roller 61 which is adapted to lightly engage one of the passing strips of blanks and to be raised intermittently by the projections 62 which have been formed upon the stock by the recesses 23. When the roller 61 is raised the opposite end of the lever 59 is correspondingly depressed thereby separating dog 54 from the lug 53 and releasing the trip clutch member 51 which by virtue of its inner spring is now carried into engagement with the freely rotatable clutch member 63. The latter is rigid with a sprocket 64 around which passes chain 65 by which the mechanism just described is connected with the source of power. Rigidly mounted on the outer end of shaft 49 is a grooved collar 66. A friction brake consisting of the adjustable clamp 67 which embraces the grooved collar 66 is held against rotation by an arm 68 disposed in a bracket 68′ and laterally movable therein when shaft 49 moves laterally as later described.

The brake serves to slow down rotation of shaft 49 and prevent jar when lug 53 engages dog 54 and moves down the tapered edge 62 of the latter until it comes to rest on shoulder 96. It will be seen that as a projection 62′ on the stock engages roller 61 it momentarily actuates dog 54 through lever 59 and frees clutch member 51, and the latter through the pressure of its spring engages driven clutch member 63 and rotates the knife shaft 49. However, as soon as roller 61 passes off the projection on the stock the dog 54 springs back into the path of lug 53 so as to again open the clutch and stop the knife after one revolution.

Means are also provided for imparting a lateral movement to the knife during its rotary cutting movement, as follows: Mounted on the end of shaft 49 opposite the clutch is a peripherally grooved cam 69, its groove having a short and sharply inclined offset 69′. Movable in the cam groove is a cam roller 70 carried on a support adjustably mounted by a screw thread connection to the base 46. At the proper point in the revolution of the knife the entire knife carrying mechanism is given a sharp lateral movement by the engagement of cam roller 70 with offset 69′.

A cutting block 71 is held to the bed plate 46 by means of bolts 72 which limit upward movement thereof. Springs 73 operate to normally press the cutting block upwardly from the bed plate so that the conveyor 28 which passes over the cutting block extends into the path of the rotary knife for a distance of approximately one-quarter of an inch. As the knife passes downwardly in its rotation the bed plate and conveyor can yield to permit rotation of the knife.

Heat is applied to the knife by means of a current of electricity which is conducted to and from the rheostat 74 (Fig. 1) through wires 75 to carbon brushes 76, brass collector rings 77, and along wires 97 through the heating units 98 of which there are three secured on each side of the knife blade 45 by the clamps 50. The knife has a dull edge which bears against the conveyor without injury. The number of heating units can be varied the object being to uniformly heat the entire length of knife blade. An insulating ring 99 is mounted on the cutter shaft 49 to insulate the brass collector ring 77 therefrom. The cutting action is facilitated by the fact that the knife is heated.

Instead of causing actuation of the knife by means of the projection 62′ carried on a strip of stock and the lever 59 as previously described, other suitable timing devices may be used in order that the knife can be operated to sever the blanks. Such a device as the friction cone shown in Fig. 1 can be used, this being a well-known apparatus of this type. It consists of two cone-shaped rolls 85 and 86 which are carried by the frame 87. Roll 86 rotates with the shaft 88 upon which it is mounted and which carries sprocket 89 from which a chain 90 runs to sprocket 91 rigidly secured to conveyor roll 34. This constitutes the driving connection for the friction cone. The cone 85 which tapers oppositely to cone 86 is mounted on shaft 92 upon frame 87 so that there is a slight space between the cones, which space is adapted to receive a friction belt 93. Shaft 92 carries a sprocket (not shown) which is connected by chain 65 with sprocket 64 loosely mounted on the shaft 49. By varying the position of the friction belt 93 the speed of drive of chain 65 can be varied at will. This is a well-known expedient and forms no part of the present invention. By means of this timing device the knife 45 can be caused to rotate at such a rate of speed that the blanks will be severed at the proper point as they are carried along the conveyor.

As a means of preventing imperfect blanks and any other bits of stock, which have not been removed by the operator and adhere to the conveyor, from being carried around to the driving rolls, a suitable piece of weighted corrugated flexible material 80 such as a sheet of rubber soling is mounted adjacent the end of the table 31 and allowed to hang slightly over the end of the conveyor to form a drag which serves to roll up scrap pieces of stock as they are carried along loosening them from the conveyor and dropping them into a suitable receptacle (not shown). The drag may be weighted by placing on it a bag containing for instance litharge, or any other suitable means may be employed. Such a drag is laterally flexible and when bearing upon a localized lump of rubber bends around the lump to bear against the conveyor and prevent thin sheets of the stock carried thereon from passing by.

In the operation of the machine, the calender rolls 2, 3 and 4, and the embossing roll 5$^a$ are all heated by steam to the usual calendering temperatures for rubber stock of the type used in making rubber shoe uppers but the grooving roll 8 as before stated is heated to a higher temperature. A bank of unvulcanized rubber stock 81 is applied to the lower calender rolls 2 and 3 and in the usual calendering operation the stock is sheeted out to the desired gauge for making rubber shoe uppers, which gauge is approximately .015″ to .022″. The sheet passes around the top roll 4 of the calender and between it and the embossing roll 5$^a$ which is adjusted with respect thereto so as to keep the gauge of the sheeted stock at the desired thickness. During its passage between the rolls 4 and 5$^a$, rubber flows into the grooves of the embossing roll to form a bead on the sheet of stock, which bead is located at the upper edge of a finished shoe. Also rubber flows into the recess 23 of the embossing roll to form a projection 62' on the sheet, which projection as before stated will serve to actuate the knife at a later stage of the operation. As the embossing roll revolves, it carries the embossed sheet of stock on its surface where it is engaged by the rotary knives 24 which bear against each end of the roll and by reason of which the outside edges of the sheet are trimmed off. This removes any projections of rubber stock which may extend outwardly and impede the operation.

The embossed sheet is carried around the surface of the roll 5ª until it passes between the roll and ribbed roll 8. The stock which has been subjected to the heat and mastication of the warm rolls of the heated calender and the embossing roll is plastic and is pressed by the ribbed roll, which is preferably heated above the temperature of the calender rolls, with sufficient force to cause the ribs 16, 17 and 18 forming the outlines of the blanks, the outer sides of which are $\frac{1}{16}''$ wide and of greater depth than the sheet is thick, to be pressed deep into the sheet, leaving only a thin film of connecting rubber. The ribs in this operation groove into the sheet of rubber the outlines of continuous strips of blanks having a thin film of rubber connecting the strips. Similarly in this operation, grooves extending nearly through the stock are formed in each blank, said grooves having the outline of the throat of the rubber shoe upper. By reason of the width of the ribs on their bearing surfaces, they do not entirely penetrate the sheet of stock and the film of rubber which remains between them and the roll 5ª is extremely thin. This film protects the roll against the scoring and wear which would inevitably occur if there is a metal to metal contact of the ribs with the roll 5ª. Also by reason of the thinness of the separating films of rubber at the bottom of the grooves formed by the ribs, these films do not offer any appreciable resistance to the separation of the blanks from the waste stock.

Complete severance of the rubber is caused by the silver or other inserts of the roll 5ª. This roll which is made of polished steel, with the exception of the inserts, is heated to the ordinary calendering temperatures for this type of stock. These temperatures are designed to be less than that at which rubber will adhere to the steel. The silver or other inserts have a higher heat conductivity than the steel and become hotter to the rubber and cause the rubber to adhere to them. Copper, silver, etc. at calendering temperatures have the inherent quality of causing rubber composition to firmly adhere thereto.

This adherence is furthered by the fact that the sheet of rubber is warm and tacky from having been worked on the rolls. Consequently, as a sheet passes around the embossing roll, those portions of stock which bear against the inserts adhere thereto with sufficient strength to be retained on the roll tearing the film at the base of the grooves. The portions of the strips constituting the blanks are caused to pass over the top of the ribbed roll. The inserts by virtue of their adhesive property lead the scrap rubber including the throat scrap not included in the blanks back over the roll 5ª. In so doing, the bonding film, left by the ribs 16, 17 and 18, which holds the grooved portions of stock together, is caused to be torn or ruptured. In this way, there are led from the cutter roll in the device illustrated, three strips, each of which forms a series of blanks secured end to end. These strips are laterally separated by a sufficient space to prevent their being accidently brought into contact and adhering to each other. The strips of stock which are held to the embossing roll by the inserts are returned to a point between the roll and top calender roll where they enter a bank of stock and will again pass through the operation of being sheeted, embossed and grooved. By reason of the yielding mounting of the roll 8, there is sufficient flexibility between rolls 5ª and 8 so that variations in the diameters of the rolls caused by temperature changes do not result in scoring or grinding of the surfaces of the rolls.

The separated strips of blanks are led immediately to the conveyor before they have had an opportunity to cool and shrink and are at once adhesively pressed upon the holding surface of the conveyor by the yielding presser roll 42. This presses the strips with sufficient force to cause their adherence to the surface of the conveyor sufficiently to prevent any substantial shrinkage or distortion. However, the pressure roll is sufficiently yielding both in its surface and in the springs which force it upon the strips so that it does not injure the embossing on the surface of the strips.

The conveyor carries these strips upon its surface for a period of approximately three minutes, at the end of which time the tendency of the strips to shrink and distort has practically ceased. The strips have then cooled considerably and have assumed a relatively set condition so that a single rubber shoe upper blank cut from a strip will shrink only at the rate of about $\frac{3}{4}''$ for every $16''$ in length and does not distort appreciably. Without this treatment a rubber shoe upper blank, the length of which is about $15''$, will shrink at least $2''$ in length and will distort considerably.

The length of time that the strips are held fast to the conveyor can be varied according to the amount of shrinkage that can be permitted in the strips. Firmly securing the strips to the conveyor serves also to hold them positively in place so that a knife can be actuated mechanically to sever them into blanks at the exact point desired.

The strips are then carried by the conveyor into the path of operation of the transversely extending knife which is designed to sever them into blanks. This knife is maintained hot enough to facilitate the cutting operation and is intermittently operated in rotary movement about its longitudinal axis. A complete revolution of the knife is made with the passage of each blank. The actuation of the knife in one modification is caused by the projection 62' which was formed by the embossing roll upon the surface of one of the strips. In its passage toward the knife this projection travels under the roller 61 elevating the same and causing one revolution of the knife through the chain of connections previously described. The conveyor carrying the strips passes over the cutting block 71 which by virtue of the spring 73 presses the conveyor into the path of rotation of the knife to the extent of about 1/4". The knife is rotated in the direction of travel of the surface of the conveyor belt which it engages at a rate of speed about twice that of the conveyor. Therefore, the strip of stock having a gauge of .022" or less is contacted by the knife during about 1" of forward travel. During approximately 1/2" of forward travel of the stock, it is additionally subjected to a lateral cutting action of the knife due to the sideways kick of the knife caused by the cam connection at one end of the shaft upon which the knife is mounted. The kicking action of the knife prevents the tacky rubber from sticking thereto. Since the knife rotates at twice the speed of travel of the conveyor, after cutting it tends in its upward movement to raise the severed ends of the blanks from the conveyor and facilitates their removal from the conveyor by the operator.

The severed blanks are carried along over the surface of the table 31 where they are picked off manually by operators and placed in books or otherwise stored until they can be used. Some blanks are defective and occasionally blanks are missed by the operator as they pass by. In this event they are carried underneath the drag 80 which serves to loosen them so that they will drop from the end of the conveyor as previously described.

While the invention has been disclosed in detail as applied to the manufacture of uppers for rubber footwear, it comprehends any use to which it is adapted both as to the shape of the blanks and as to the composition of which they are to be made. For example blanks for hot water bottles, etc., might be similarly formed. The elements of the preferred combination of parts above disclosed in detail may be varied in shape and in location and parts of the complete combination disclosed may be employed to advantage. The invention therefore contemplates all changes in which the disclosed principles are used, among which are the following: The use of the heated metallic inserts in a pair of cooperating rolls to effect a tearing or pulling apart of incompletely severed stock whereby the waste material may be led away in one direction and the strip of connected blanks led away in another direction; the use of a rib roll in combination with a plain or embossed roll to effect the outlining of the blanks, their separation to be effected by tearing or parting the thin film of stock connecting the blank portions with the waste portions of the stock by hand or with a knife in any manner desired; the use of a rib roll in combination with a plain or embossed roll in forming blanks, with any form of yielding means which will permit the rib roll to almost, but not quite completely, separate the stock; the unitary mounting of the rib roll and the embossed or plain roll in a housing or block which may be mounted and removed together in one operation and also with a single means of adjustment relative to means for sheeting the stock such as a calender or its equivalent; the use of the above mentioned features alone or in combination with a conveyor or liner upon which the blank portions may be supported and held against intolerable shrinkage or distortion; and the omission of the metallic heated inserts where the nature of the stock would permit the waste portions thereof to be torn from the blank portions thereof by mere conduct of the waste portions to the bank between the embossing or plain roll and the calender or other means for initially sheeting and/or warming the stock to the proper temperature.

Having thus described my invention what I claim and desire to protect by Letters Patent is:—

1. The method of forming sheet rubber blanks which comprises separating a sheet of warm rubber stock into blanks which are held together at their ends to form a continuous strip, positively securing the strip to a support and severing the individual blanks of the strip while so secured.

2. The method of forming sheet rubber blanks which comprises sheeting rubber stock, grooving the sheet of stock and parting the same at the grooves to form blanks which are joined together at their ends to form a strip, and securing the strip as it is formed to a support to minimize shrinkage.

3. The method of forming sheet rubber blanks which comprises sheeting rubber stock, embossing a design thereon, grooving the sheet of stock, parting the same at the grooves to form blanks which are joined together at their ends to form a strip, and superficially fixedly securing the strip until it has assumed a relatively set condition whereby misshaping of the design is prevented.

4. The method of forming sheet rubber blanks which comprises forming a projection at intervals on a strip of rubber stock, passing the strip under a rotary cutting means, and actuating the cutting means intermittently by means of the projection.

5. The method of forming sheet rubber blanks which comprises sheeting rubber stock, forming a projection at intervals on the strip of stock, forming the outlines of a series of blanks of the stock joined together at their ends to form a strip, maintaining the strip against shrinkage and distortion while carrying it into position to be severed and governing the severing action by said projection.

6. The method of forming sheet rubber blanks which comprises grooving a sheet of warm rubber stock into the outline of blanks secured at their ends, removing the scrap stock lying adjacent the grooves to leave a strip of connected blanks, transferring the strip to a position to be operated upon by a knife, maintaining the strip against substantial shrinkage during transit, and severing the individual blanks.

7. The method of forming sheet rubber blanks which comprises grooving a sheet of rubber stock to form spaced strips of blanks connected by surplus stock, removing the surplus stock, securing the strips adhesively to a moving support during shrinkage, and cutting the strips into individual blanks while held to the support.

8. The method of forming sheet rubber blanks which comprises continuously sheeting rubber stock, continuously forming and removing from the sheet stock blanks which are held together at their ends to form a strip, securing the strip to a support to prevent shrinkage, maintaining the strip so held until it assumes a relatively set condition, and severing the blanks while held.

9. The method of forming sheet rubber blanks which comprises disposing a bank of rubber stock between rotating engraved rolls to form a sheet, continuously withdrawing a strip of formed blanks from the sheet, continuously returning the balance of the sheet to the bank of stock, securing the strip to a support before shrinkage and maintaining the strip so secured until it assumes a relatively set condition, and severing the blanks while so held.

10. A process of treating unvulcanized rubber stock which comprises forming a continuous strip of connected blanks of heated rubber stock bearing embossed designs and pressing the hot strip directly as formed upon a holding surface by a yielding pressure against the side of the strip bearing the designs whereby the design is uninjured.

11. The process of removing sheeted unvulcanized rubber stock from the surface of a conveyor to which it adheres which comprises pressing a flexible weighted drag against the surface carrying unvulcanized rubber stock and causing travel of the conveyor whereby the stock is loosened and drops off the end of the conveyor.

12. The process of removing sheeted unvulcanized rubber stock from the surface of a conveyor to which it adheres which comprises pressing a flexible weighted sheet drag against the surface bearing the rubber and causing travel of the conveyor relatively to the drag whereby the rubber is loosened sufficiently to drop off the end of the conveyor.

13. The method of forming sheet rubber blanks which comprises sheeting a bank of rubber stock, forming in the sheet blanks continuously connected by a film of rubber composition, rupturing the film and continuously withdrawing the blanks from the sheet, and automatically returning all the waste material of the sheet to the bank of stock.

14. The method of forming sheet rubber blanks which comprises sheeting rubber stock, melting flat bottom grooves into the sheet stock to form blanks connected by thin films of the rubber at the bottom of the grooves, and breaking the films.

15. The method of forming sheet rubber blanks which comprises forming rubber stock into sheets comprising blanks and attached waste rubber stock, passing the sheets in contact with a heated polished surface having different adhesive properties adjacent the blanks and waste rubber stock, and effecting different directions of travel of the heated surface and blanks whereby the blanks and waste stock are caused to be separated.

16. The method of forming sheet rubber blanks which comprises, securing portions of a sheet of rubber stock to the surface of a roller by means of the adhesion of the rubber to spaced heated copper inserts in the roller, and operating upon the stock at points between the copper inserts whereby a strip of stock is formed which is conducted off the roller leaving the waste portions of stock adhering to the roller.

17. In a device of the class described, in combination, means for embossing a strip of rubber stock, a conveyor for receiving the embossed strip, presser means for securing the strip to the conveyor, and cutter means governed by the speed of the conveyor whereby the strip is cut transversely at intervals.

18. In a device of the class described, in combination, means for sheeting rubber stock and outlining thereon by grooves a strip of attached blanks and waste stock, means carried by said first means for separating the waste stock from the blanks, a conveyor for receiving the strip, presser means cooperating with the conveyor to cause the strip to adhere to the conveyor, a knife mounted to cut the strip on the conveyor transversely, and means for actuating the elements of the apparatus all in timed relation.

19. In a device of the class described, in combination, roller means for continuously sheeting a bank of unvulcanized rubber stock, ribbed means cooperating therewith for forming in the sheeted stock the grooved outlines of a strip of attached blanks, metallic holding means for continuously separating the waste stock from the blanks, a conveyor for removing the strip, presser means cooperating with the conveyor to cause the strip to adhere to the conveyor, a transversely extending knife mounted to cut the strip on the conveyor transversely, and means for actuating the elements of the apparatus in timed relation.

20. In a device of the class described, in combination, roller means for heating and sheeting unvulcanized rubber stock, ribbed means cooperating therewith for forming the heated stock into a series of blanks attached to their ends to form a strip, a conveyor for receiving the heated strip and for carrying it while it sets, presser means for securing the strip to the conveyor whereby shrinkage is prevented, cutting means for severing the strip transversely, and means for actuating the elements in timed relation.

21. A device of the class described comprising rolls for sheeting rubber stock from a bank and forming a strip of blanks and attached scrap, and heated means having a smooth surface coextensive with one of the rolls having a greater adhesion to rubber than the roll, said last means contacting with the scrap whereby scrap stock from the blanks is withdrawn and returned to the bank.

22. In a device of the class described in combination, roller means for sheeting rubber stock, a ribbed roll cooperating therewith for forming in the sheeted rubber stock the grooved outline of blanks joined at their ends to form a strip, adhesive means for withdrawing the excess stock, conveyor means provided with a holding surface mounted to receive the strip as formed, and presser means for securing the strip thereto whereby shrinkage is prevented, all operated in timed relation.

23. In a device of the class described in combination, a roll, a ribbed roll cooperating therewith, means for operating the rolls whereby sheet unvulcanized rubber stock is formed into blanks attached at their ends to form a strip, conveyor means for receiving and removing the strip as it is cut, presser means for securing the strip to the conveyor, cutting means, and means for actuating the cutting means to sever the blanks upon the conveyor.

24. In a device of the class described, in combination, heated roller means about which sheet rubber is adapted to be carried, means cooperating with the roller means for defining blank and scrap portions in the sheet, and spaced inserts carried by the roller means opposite the scrap portions having a relatively higher adhesion to unvulcanized rubber than said roller means.

25. In a device of the class described, in combination, a conveyor mounted for carrying rubber stock, means for causing travel of the conveyor, and a stationarily mounted flexible sheet drag having a surface cooperating with the conveyor to break the adhesion between the conveyor and stock whereby the stock is permitted to drop off the end of the conveyor.

26. In a device of the class described, in combination, a conveyor mounted for carrying unvulcanized rubber stock, means for causing travel of the conveyor, and a weighted flexible sheet drag frictionally engaging the stock on the conveyor to break the adhesion between the conveyor and the stock whereby the stock is permitted to drop off the end of the conveyor.

27. A unit for forming strips of rubber which comprises a roll, a blunt ribbed roll cooperating therewith, means for rotating the rolls whereby rubber stock can be carried between them and be deeply grooved but not severed by the ribbed roll, and heated smooth metallic means having a relatively greater adhesion than the roll for the rubber stock for causing adherence of a portion of the stock bounded by the grooves to one of the rolls.

28. A unit for forming strips of rubber which comprises a roll, a print roll mounted opposed thereto, means for rotating the rolls whereby a bank of warm unvulcanized rubber stock carried thereby can be sheeted, a ribbed roll mounted for rotation in engagement with the print roll, means for rotating the same whereby the sheeted rubber stock is deeply grooved but not severed, and polished means carried by the print roll having a relatively strong adhesion to the warm rubber and adapted to engage with and cause portions of the grooved stock to adhere thereto whereby portions of the stock bounded by the grooves are torn from the sheet and returned to the bank of stock.

29. A unit for forming strips of rubber which comprises a print roll, a ribbed roll, means for pressing one of the rolls into yielding engagement with the other, means for rotating the rolls whereby rubber stock is carried between them and is grooved by the ribbed roll and metallic inserts of relatively high heat conductivity carried by one of the rolls for causing adhesion of a portion of the grooved stock to one of the rolls.

30. In combination, cooperating rolls for outlining patterns in a sheet of heated plastic stock, and inserts of different specific heat carried by one of the rolls for adhesively retaining on said roll parts of said stock bounded by said outlines.

31. In a device of the class described, a plurality of cooperating rolls, means for rotating the same whereby a bank of rubber composition can be sheeted, means for heating one of the rolls, metallic inserts carried by the heated roll having a relatively greater adhesion for rubber stock than the remainder of the roll, whereby portions of the stock adhere to the roll and are withdrawn from the sheet.

32. That method of forming a plurality of blanks from plastic composition which includes continuously sheeting the composition to a predetermined thickness, continuously forming in the sheet a connected series of blanks of irregular dimensions, said blanks being connected throughout their peripheries to the balance of the sheet by a very thin film of the composition, subsequently continuously tearing the blanks from the sheet and conducting them away in a different path from the remainder of the sheet, and maintaining the blanks in flattened shape until they have cooled down to a shape retentive condition.

33. In a device of the class described, a roll, inserts in the face thereof of metal having higher heat conductivity than the body of the roll, and a cooperating roll provided with means for nearly completely severing plastic sheet material whereby it may be formed into blanks with intermediate waste material which may be simultaneously torn and conducted away in a different direction from the blanks.

34. In a device of the class described, the combination with a roll, of a ribbed roll the ribs of which have a flat outer bearing surface, and means for yieldingly maintaining the two rolls in cooperative relation to nearly completely sever plastic material.

35. In a device of the class described, means for continuously sheeting stock, in combination with a pair of cooperating rolls, one of which is equipped with projecting blunt edged rib-means of a desired pattern for grooving the stock, means for yieldingly maintaining the pair of rolls in cooperative working relation, and a unitary mounting for said pair of rolls adjustably disposed with respect to said stock sheeting means.

36. In a device of the class described, means for continuously sheeting heated plastic material, an embossing roll, a blunt ribbed roll yieldingly maintained in cooperative working relation with the embossing roll to form blanks of irregular dimensions connected at all points to the remainder of the sheet by a thin film of rubber, means for separating the remainder of the sheet from the blanks, and means immediately adjacent the ribbed roll for receiving blanks delivered therefrom and maintaining them in flattened shape against objectionable distortion while cooling.

Signed at Naugatuck, county of New Haven, State of Connecticut, this 23rd day of August, 1926.

FREDERICK R. DEAN.

CERTIFICATE OF CORRECTION.

Patent No. 1,797,568.                    Granted March 24, 1931, to

FREDERICK R. DEAN.

It is hereby certified that error appears in the printed specification of the above numbered patent requiring correction as follows: Page 8, line 60, claim 23, for the word "cut" read formed; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.